United States Patent
Chang

(10) Patent No.: US 7,668,554 B2
(45) Date of Patent: Feb. 23, 2010

(54) NETWORK SYSTEM FOR AIDED GPS BROADCAST POSITIONING

(75) Inventor: Steve Chang, San Jose, CA (US)

(73) Assignee: SiRF Technology, Inc., San Jose, CA (US)

( * ) Notice: Subject to any disclaimer, the term of this patent is extended or adjusted under 35 U.S.C. 154(b) by 0 days.

(21) Appl. No.: 11/303,881

(22) Filed: Dec. 16, 2005

(65) Prior Publication Data

US 2006/0223549 A1  Oct. 5, 2006

Related U.S. Application Data

(63) Continuation-in-part of application No. 10/154,138, filed on May 21, 2002.

(60) Provisional application No. 60/292,774, filed on May 21, 2001.

(51) Int. Cl.
*H04W 68/00* (2009.01)

(52) U.S. Cl. .............................. 455/456.2; 342/357.06; 340/539.13

(58) Field of Classification Search ............... 455/456.1, 455/456.2, 456.6, 456.5; 342/357.06; 340/539.13
See application file for complete search history.

(56) References Cited

U.S. PATENT DOCUMENTS

| | | | |
|---|---|---|---|
| 4,426,712 A | 1/1984 | Gorski-Popiel |
| 4,445,118 A | 4/1984 | Taylor et al. |
| 4,463,357 A | 7/1984 | MacDoran |
| 4,578,678 A | 3/1986 | Hurd |
| 4,667,203 A | 5/1987 | Counselman, III |
| 4,701,934 A | 10/1987 | Jasper |
| 4,754,465 A | 6/1988 | Trimble |
| 4,785,463 A | 11/1988 | Janc et al. |
| 4,809,005 A | 2/1989 | Counselman, III |
| 4,821,294 A | 4/1989 | Thomas, Jr. |
| 4,890,233 A | 12/1989 | Ando et al. |
| 4,894,662 A | 1/1990 | Counselman |
| 4,998,111 A | 3/1991 | Ma et al. |
| 5,014,066 A | 5/1991 | Counselman, III |
| 5,036,329 A | 7/1991 | Ando |
| 5,043,736 A | 8/1991 | Darnell et al. |
| 5,108,334 A | 4/1992 | Eschenbach et al. |
| 5,177,490 A | 1/1993 | Ando et al. |
| 5,202,829 A | 4/1993 | Geier |
| 5,223,844 A | 6/1993 | Mansell et al. |
| 5,225,842 A | 7/1993 | Brown et al. |

(Continued)

FOREIGN PATENT DOCUMENTS

EP  0511741  11/1992

(Continued)

OTHER PUBLICATIONS

3GPP TS 44.035 v4.0.0 (Apr. 2001).*

(Continued)

*Primary Examiner*—Nay A Maung
*Assistant Examiner*—Angelica M Perez
(74) *Attorney, Agent, or Firm*—K&L Gates LLP

(57) ABSTRACT

A network approach for aided GPS broadcast positioning where A-GPS data is made available in the network and broadcast via cell broadcast servers to wireless devices in order to reduce the time required to determine the position of a wireless device.

24 Claims, 4 Drawing Sheets

U.S. PATENT DOCUMENTS

| | | |
|---|---|---|
| 5,257,195 A | 10/1993 | Hirata |
| 5,293,170 A | 3/1994 | Lorenz et al. |
| 5,311,195 A | 5/1994 | Mathis et al. |
| 5,323,164 A | 6/1994 | Endo |
| 5,343,209 A | 8/1994 | Sennott et al. |
| 5,345,244 A | 9/1994 | Gildea et al. |
| 5,347,284 A | 9/1994 | Volpi et al. |
| 5,347,536 A | 9/1994 | Meehan |
| 5,365,450 A | 11/1994 | Schuchman et al. |
| 5,379,224 A | 1/1995 | Brown et al. |
| 5,402,347 A | 3/1995 | McBurney et al. |
| 5,402,441 A | 3/1995 | Washizu et al. |
| 5,416,712 A | 5/1995 | Geier et al. |
| 5,420,593 A | 5/1995 | Niles |
| 5,422,813 A | 6/1995 | Schuchmman et al. |
| 5,440,313 A | 8/1995 | Osterdock et al. |
| 5,450,344 A | 9/1995 | Woo et al. |
| 5,504,684 A | 4/1996 | Lau et al. |
| 5,506,587 A | 4/1996 | Lans |
| 5,535,278 A | 7/1996 | Cahn et al. |
| 5,587,715 A | 12/1996 | Lewis |
| 5,592,173 A | 1/1997 | Lau et al. |
| 5,625,668 A | 4/1997 | Loomis et al. |
| 5,663,734 A | 9/1997 | Krasner |
| 5,663,735 A | 9/1997 | Eshenbach |
| 5,666,330 A | 9/1997 | Zampetti |
| 5,701,328 A | 12/1997 | Schuchman et al. |
| 5,726,893 A | 3/1998 | Schuchman et al. |
| 5,739,786 A | 4/1998 | Greenspan et al. |
| 5,757,786 A | 5/1998 | Joo |
| 5,781,156 A | 7/1998 | Krasner |
| 5,786,789 A | 7/1998 | Janky |
| 5,812,087 A | 9/1998 | Krasner |
| 5,825,327 A | 10/1998 | Krasner |
| 5,828,694 A | 10/1998 | Schipper |
| 5,831,574 A | 11/1998 | Krasner |
| 5,841,396 A | 11/1998 | Krasner |
| 5,845,203 A | 12/1998 | LaDue |
| 5,854,605 A | 12/1998 | Gildea |
| 5,874,914 A | 2/1999 | Krasner |
| 5,877,724 A | 3/1999 | Davis |
| 5,877,725 A | 3/1999 | Kalafus |
| 5,883,594 A | 3/1999 | Lau |
| 5,884,214 A | 3/1999 | Krasner |
| 5,889,474 A | 3/1999 | LaDue |
| 5,903,654 A | 5/1999 | Milton et al. |
| 5,907,578 A | 5/1999 | Pon et al. |
| 5,907,809 A | 5/1999 | Molnar et al. |
| 5,917,444 A | 6/1999 | Loomis et al. |
| 5,920,283 A | 7/1999 | Shaheen et al. |
| 5,923,703 A | 7/1999 | Pon et al. |
| 5,926,131 A | 7/1999 | Sakumoto et al. |
| 5,936,572 A | 8/1999 | Loomis et al. |
| 5,940,027 A | 8/1999 | Forseth et al. |
| 5,943,363 A | 8/1999 | Hanson et al. |
| 5,945,944 A | 8/1999 | Krasner |
| 5,963,582 A | 10/1999 | Stansell, Jr. |
| 5,966,403 A | 10/1999 | Pon |
| 5,977,909 A | 11/1999 | Harrison et al. |
| 5,982,324 A | 11/1999 | Watters et al. |
| 5,987,016 A | 11/1999 | He |
| 5,999,124 A | 12/1999 | Sheynblat |
| 6,002,362 A | 12/1999 | Gudat |
| 6,002,363 A | 12/1999 | Krasner |
| 6,009,551 A | 12/1999 | Sheynblat |
| 6,016,119 A | 1/2000 | Krasner |
| 6,040,798 A | 3/2000 | Kinal et al. |
| 6,041,222 A | 3/2000 | Horton et al. |
| 6,047,017 A | 4/2000 | Cahn et al. |
| 6,052,081 A | 4/2000 | Krasner |
| 6,061,018 A | 5/2000 | Sheynblat |
| 6,064,336 A | 5/2000 | Krasner |
| 6,081,229 A | 6/2000 | Soliman et al. |
| 6,085,090 A | 7/2000 | Yee et al. |
| 6,097,974 A | 8/2000 | Camp, Jr. et al. |
| 6,104,338 A | 8/2000 | Krasner |
| 6,104,340 A | 8/2000 | Krasner |
| 6,104,712 A | 8/2000 | Robert et al. |
| 6,107,960 A | 8/2000 | Krasner |
| 6,111,540 A | 8/2000 | Krasner |
| 6,111,541 A | 8/2000 | Karmel |
| 6,122,506 A | 9/2000 | Lu et al. |
| 6,131,067 A | 10/2000 | Girerd et al. |
| 6,133,871 A | 10/2000 | Krasner |
| 6,133,873 A | 10/2000 | Krasner |
| 6,133,874 A | 10/2000 | Krasner |
| 6,150,980 A | 11/2000 | Krasner |
| 6,172,640 B1 | 1/2001 | Durst et al. |
| 6,178,195 B1 | 1/2001 | Durboraw, III et al. |
| 6,185,427 B1 | 2/2001 | Krasner et al. |
| 6,188,351 B1 | 2/2001 | Bloebaum |
| 6,211,819 B1 | 4/2001 | King et al. |
| 6,222,484 B1 | 4/2001 | Seiple et al. |
| 6,225,944 B1 | 5/2001 | Hayes |
| 6,236,354 B1 | 5/2001 | Krasner |
| 6,236,365 B1 | 5/2001 | LeBlanc et al. |
| 6,249,245 B1 | 6/2001 | Watters et al. |
| 6,252,543 B1 | 6/2001 | Camp et al. |
| 6,263,280 B1 | 7/2001 | Stingone, Jr. |
| 6,313,786 B1 | 11/2001 | Sheynblat et al. |
| 6,327,473 B1 | 12/2001 | Soliman et al. |
| 6,347,228 B1 | 2/2002 | Ludden et al. |
| 6,353,412 B1 | 3/2002 | Soliman |
| 6,389,291 B1 | 5/2002 | Pande et al. |
| 6,400,314 B1 | 6/2002 | Krasner |
| 6,405,132 B1 | 6/2002 | Breed et al. |
| 6,411,811 B2 | 6/2002 | Kingdon et al. |
| 6,411,892 B1 | 6/2002 | Van Diggelen |
| 6,414,987 B1 | 7/2002 | Pon |
| 6,417,801 B1 | 7/2002 | Van Diggelen |
| 6,427,120 B1 | 7/2002 | Garin et al. |
| 6,429,814 B1 | 8/2002 | Van Diggelen et al. |
| 6,429,815 B1 | 8/2002 | Soliman |
| 6,433,739 B1 | 8/2002 | Soliman |
| 6,453,237 B1 | 9/2002 | Fuchs et al. |
| 6,456,234 B1 | 9/2002 | Johnson |
| 6,462,708 B1 | 10/2002 | Tsujimoto et al. |
| 6,466,612 B2 | 10/2002 | Kohli et al. |
| 6,473,030 B1 | 10/2002 | McBurney et al. |
| 6,480,145 B1 | 11/2002 | Hasegawa |
| 6,484,097 B2 | 11/2002 | Fuchs et al. |
| 6,487,499 B1 | 11/2002 | Fuchs et al. |
| 6,505,161 B1 | 1/2003 | Brems |
| 6,510,387 B2 | 1/2003 | Fuchs et al. |
| 6,519,466 B2 | 2/2003 | Pande et al. |
| 6,526,352 B1 | 2/2003 | Breed et al. |
| 6,529,829 B2 | 3/2003 | Turetzky et al. |
| 6,542,823 B2 | 4/2003 | Garin et al. |
| 6,583,734 B2 | 6/2003 | Bates et al. |
| 6,633,255 B2 | 10/2003 | Krasner |
| 6,650,694 B1 | 11/2003 | Brown et al. |
| 6,677,894 B2 | 1/2004 | Sheynblat et al. |
| 6,684,158 B1 | 1/2004 | Gariu et al. |
| 6,707,423 B2 | 3/2004 | Turetzky et al. |
| 6,720,920 B2 | 4/2004 | Breed et al. |
| 6,731,238 B2 | 5/2004 | Johnson |
| 6,738,630 B2 | 5/2004 | Ashmore |
| 6,748,217 B1 | 6/2004 | Hunzinger et al. |
| 6,829,534 B2 | 12/2004 | Fuchs et al. |
| 6,873,288 B2 | 3/2005 | Heppe |
| 6,937,865 B1 * | 8/2005 | Bloebaum et al. .......... 455/456.1 |
| 7,091,904 B2 | 8/2006 | Vantalon et al. |
| 7,302,225 B2 * | 11/2007 | Younis .................... 455/12.1 |
| 2002/0064209 A1 | 5/2002 | Turetzky et al. |

| | | | | | | |
|---|---|---|---|---|---|---|
| 2002/0080063 | A1 | 6/2002 | Bloebaum et al. | JP | 2000-102058 | 4/2000 |
| 2002/0082774 | A1* | 6/2002 | Bloebaum ................ 701/213 | WO | WO 90/11652 | 10/1990 |
| 2002/0142783 | A1 | 10/2002 | Yoldi et al. | WO | WO 99/47943 | 9/1999 |
| 2002/0168985 | A1* | 11/2002 | Zhao et al. ................ 455/456 | WO | WO 00/10031 | 2/2000 |
| 2003/0104818 | A1 | 6/2003 | Kotziu | WO | WO 00/45191 | 8/2000 |
| 2003/0125044 | A1 | 7/2003 | Deloach et al. | WO | WO 01/62034 A | 8/2001 |
| 2003/0176204 | A1 | 9/2003 | Abraham | WO | WO 02/04975 | 1/2002 |
| 2004/0130484 | A1 | 7/2004 | Krasner | WO | WO 03/098258 | 11/2003 |
| 2004/0162084 | A1 | 8/2004 | Wang | WO | WO2006014170 | 2/2006 |
| 2006/0038719 | A1 | 2/2006 | Pande et al. | | | |

FOREIGN PATENT DOCUMENTS

| | | |
|---|---|---|
| EP | 1 092 987 | 4/2001 |
| EP | 1 427 236 A | 6/2004 |
| EP | 1 452 886 A | 9/2004 |
| GB | 2115195 | 1/1983 |
| GB | 2 335 554 A | 3/1998 |
| JP | 58-105632 | 6/1983 |
| JP | 7-36035 | 5/1986 |
| JP | 4-326079 | 11/1992 |

OTHER PUBLICATIONS

Soliman et al., gps One: A hybrid position location system, 2000 IEEE, pp. 334-335.

New Fast GPS Code-Acquisition Using FFT, Electronic Letters, vol. 27, No. 2, pp. 158-160 (1991).

Novel Fast GPS/GLONASS Code Acquisition Technique Using Low Update Rate FFT, Electronic Letters, vol. 28, No. 9, pp. 863-865 (1992).

* cited by examiner

NETWORK SYSTEM FOR AIDED GPS BROADCAST POSITIONING

RELATED APPLICATIONS

This application is a continuation-in-part of and claims priority to U.S. patent application Ser. No. 10/154,138, filed on May 21, 2002, entitled "METHOD FOR SYNCHRONIZING A RADIO NETWORK USING END USER RADIO TERMINALS," by Gregory B. Turetzky et al, that claims priority under 35 U.S.C. §119(e) of U.S. Provisional Patent Application No. 60/292,774, filed May 21, 2001, entitled "METHOD FOR SYNCHRONIZING A RADIO NETWORK USING END USER RADIO TERMINALS," by Gregory B. Turetzkey et al, U.S. patent application Ser. No. 10/874,775, filed on Jun. 23, 2004, titled "VIRTUAL SATELLITE POSITION SYSTEM SERVER," by Ashutosh Pande, Steve Chang, Lionel Jacques Garin, and Qiyue John Zhang, and U.S. patent application Ser. No. 11/089,455, filed on Mar. 24, 2005, titled "SYSTEM AND METHOD FOR PROVIDING LOCATION BASED SERVICES OVER A NETWORK," by Steve Chang, Ashutosh Pande, Lionel Jacques Garin, Kanwar Chadha, Leon Kuo-Liang Peng, Gengsheng Zhang, Nicolas Patrick Vantalon, and Gregory B. Turetzky, and U.S. patent application Ser. No. 10/696,157, filed on Oct. 19, 2004, titled "DISTRIBUTED DATA COLLECTION OF SATELLITE DATA," by Steve Chang, Ashutosh Pande, Lionel Jacques Garin, and Qiyue John Zhang, which are incorporated by reference herein.

BACKGROUND OF THE INVENTION

1. Field of the Invention

This invention relates generally to Satellite Positioning Systems (SATPS) and in particular to aided GPS broadcasting of positioning data.

2. Related Art

A Satellite Positioning System (SATPS) such as the Global Positioning System (GPS) maintained by the United States Government is based on radio navigation. The GPS system is a satellite based navigation system having a network of 24 satellites, plus on orbit spares, orbiting 11,000 nautical miles above the Earth, in six evenly distributed orbits. Each GPS satellite orbits the Earth every twelve hours.

A prime function of the GPS satellites is to serve as a clock. Each GPS satellite derives its signals from an on board 10.23 MHz Cesium atomic clock. Each GPS satellite transmits a spread spectrum signal with its own individual pseudo noise (PN) code. By transmitting several signals over the same spectrum using distinctly different PN coding sequences the GPS satellites may share the same bandwidth without interfering with each other. The code used in the GPS system is 1023 bits long and is sent at a rate of 1.023 megabits per second, yielding a time mark, sometimes called a "chip" approximately once every micro-second. The sequence repeats once every millisecond and is called the coarse acquisition code (C/A code). Every 20th cycle the code can change phase and is used to encode a 1500 bit long message, which contains "almanac" data for the other GPS satellites.

There are 32 PN codes designated by the GPS authority. Twenty-four of the PN codes belong to current GPS satellites in orbit and the 25th PN code is designated as not being assigned to any GPS satellite. The remaining PN codes are spare codes that may be used in new GPS satellites to replace old or failing units. A GPS receiver may, using the different PN sequences, search the signal spectrum looking for a match. If the GPS receiver finds a match, then it has identified the GPS satellite, which generated that signal.

Ground based GPS receivers use a variant of radio range measurement methodology, called trilateration, in order to determine the position of the ground based GPS receiver. The GPS position determination is different from the radio direction finding (RDF) technology of the past in that the radio beacons are no longer stationary; they are satellites moving through space at a speed of about 1.8 miles per second as they orbit the earth. By being space based, the GPS system can be used to establish the position of virtually any point on Earth using methods such as trilateration.

The trilateration method depends on the GPS receiving unit obtaining a time signal from the GPS satellites. By knowing the actual time and comparing it to the time that is received from the GPS satellites, the receiver can calculate the distance to the GPS satellite. If, for example, the GPS satellite is 12,000 miles from the receiver, then the receiver must be located somewhere on the location sphere defined by the radius of 12,000 miles from that GPS satellite. If the GPS receiver then ascertains the position of a second GPS satellite it can calculate the receiver's location based on a location sphere around the second GPS satellite. The two spheres intersect and form a circle with the GPS receiver being located somewhere within that location circle. By ascertaining the distance to a third GPS satellite the GPS receiver can project a location sphere around the third GPS satellite. The third GPS satellite's location sphere will then intersect the location circle produced by the intersection of the location spheres of the first two GPS satellites at just two points. By determining the location sphere of one more GPS satellite, whose location sphere will intersect one of the two possible location points, the precise position of the GPS receiver is determined to be the location point located on the Earth. The fourth GPS satellite is also used to resolve the clock error in the receiver. As a consequence, the exact time may also be determined, because there is only one time offset that can account for the positions of all the GPS satellites. The trilateration method may yield positional accuracy on the order of 30 meters; however the accuracy of GPS position determination may be degraded due to signal strength and multipath reflections.

As many as 11 GPS satellites may be received by a GPS receiver at one time. In certain environments such as a canyon, some GPS satellites may be blocked out, and the GPS position determining system may depend for position information on GPS satellites that have weaker signal strengths, such as GPS satellites near the horizon. In other cases overhead foliage may reduce the signal strength that is received by the GPS receiver unit. In either case the signal strength may be reduced or totally blocked. In such case, aiding information may be used to aid in location determination.

There are multiple ways of using radio spectrum to communicate. For example in frequency division multiple access (FDMA) systems, the frequency band is divided into a series of frequency slots and different transmitters are allotted different frequency slots. In time division multiple access (TDMA) systems, the time that each transmitter may broadcast is limited to a time slot, such that transmitters transmit their messages one after another, only transmitting during their allotted period. With TDMA, the frequency upon which each transmitter transmits may be a constant frequency or may be continuously changing (frequency hopping).

As previously mentioned, another way of allotting the radio spectrum to multiple users is through the use of code division multiple access (CDMA) also known as spread spectrum. In CDMA all the users transmit on the same frequency band all of the time. Each user has a dedicated code that is used to separate that user's transmission from all others. This code is commonly referred to as a spreading code, because it spreads the information across the band. The code is also commonly referred to as a Pseudo Noise or PN code. In a GPS CDMA transmission, each bit of transmitted data is replaced by that particular user's spreading code if the data to be transmitted is a "1", and is replaced by the inverse of the spreading, code if the data to be transmitted is "0".

To decode the transmission at the receiver unit it is necessary to "despread" the code. The despreading process takes the incoming signal and multiplies it by the spreading code chip by chip and sums the result. This process is commonly known as correlation, and it is commonly said that the signal is correlated with the PN code. The result of the despreading process is that the original data may be separated from all the other transmissions, and the original signal may be recovered. A property of the PN codes that are used in CDMA systems is that the presence of one spread spectrum code does not change the result of the decoding of another code. The property that one code does not interfere with the presence of another code is often referred to as orthogonality, and codes, which have this property, are said to be orthogonal. The process of extracting data from a spread spectrum signal is commonly known by many terms such as correlating, decoding, and despreading. Those terms may be used interchangeably herein. The codes used by a spread spectrum system are commonly referred to by a variety of terms including, but not limited to, PN (Pseudo Noise) codes, PRC (Pseudo Random Codes), spreading code, despreading code, and orthogonal code. Those terms may also be used interchangeably herein.

It is because CDMA spreads the data across a broadcast spectrum larger than strictly necessary to transmit data that CDMA is often referred to as spread spectrum. Spread spectrum has a number of benefits. One benefit being that because the data transmitted is spread across the spectrum, spread spectrum can tolerate interference better than some other protocols. Another benefit is that messages can be transmitted with low power and still be decoded, and yet another benefit is that several signals can be received simultaneously with one receiver tuned on the same frequency.

The GPS system uses spread spectrum technology to convey its data to ground units. The use of spread spectrum is especially advantageous in satellite positioning systems. Spread spectrum technology enables GPS receiver units to operate on a single frequency, thus saving the additional electronics that would be needed to switch and tune other bands if multiple frequencies were used. Spread Spectrum also minimizes power consumption requirements of GPS receivers. GPS transmitters for example require 50 watts or less and tolerate substantial interference.

Although the GPS system is available widely, there are conditions that can degrade its performance or block the effectiveness of individual GPS satellite position system receiver units, such as GPS receivers. But while some GPS receivers are less effective in determining their location others may not be blocked and are able to determine their location.

A known approach improving a GPS receiver units' ability to acquire the visible GPS satellites is to use aiding information such as a timing signal provided by a fixed terrestrial network or almanac and ephemeris data stored in a fixed network device. The network device then establishes point-to-point communication with the device that requires aiding. But, the implementation of point-to-point fixed network solutions require expensive equipment to be purchased and maintained by network operators. Point-to-point fixed network solutions are also susceptible to network outages and failures.

Such point-to-point approaches to increasing the ability of the GPS receiver unit to acquire GPS satellites and determine the location of the GPS receiver unit involved the GPS receiver unit being configured to receive aiding or assisting data from another network device using point-to-point communication, such as a cellular network. But, such approaches are less then optimal due to the number of different types of networks, cost of network infrastructure and problems inherent with outages that may occur within fixed networks.

Therefore, there is a need for methods and systems for improving the ability of GPS receiver units to determine their location that overcomes the disadvantages set forth above and others previously experienced.

SUMMARY

Systems consistent with the present invention provide an approach to delivering aiding information to a wireless device from a network using broadcast aiding information.

The network is able to receive positioning data at a GPS reference receiver, from a GPS reference network, or a combination of the GPS reference receiver and the GPS reference network. That GPS information is stored in a GPS data center that provides aiding information to a GPS server. The GPS server is accessed by a location based service server. The location based service server initiates a broadcast message containing aiding information that is transmitted by a cell broadcast server. The aiding information is then received by a Mobile Station and used to determine the position of the Mobile Station.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

DETAILED DESCRIPTION

Unlike the known approaches previously discussed, an aided GPS broadcast positioning approach enables a network, such as a cellular network to provide aiding or assistance data to multiple Mobile Stations using a broadcasting of aiding data as opposed to a point-to-point aiding approach (one server to provide aiding or assistance data to one Mobile Station). The aided GPS broadcast approach requires less network resources to implement in a network than traditional point-to-point aiding approaches.

Figure 1:
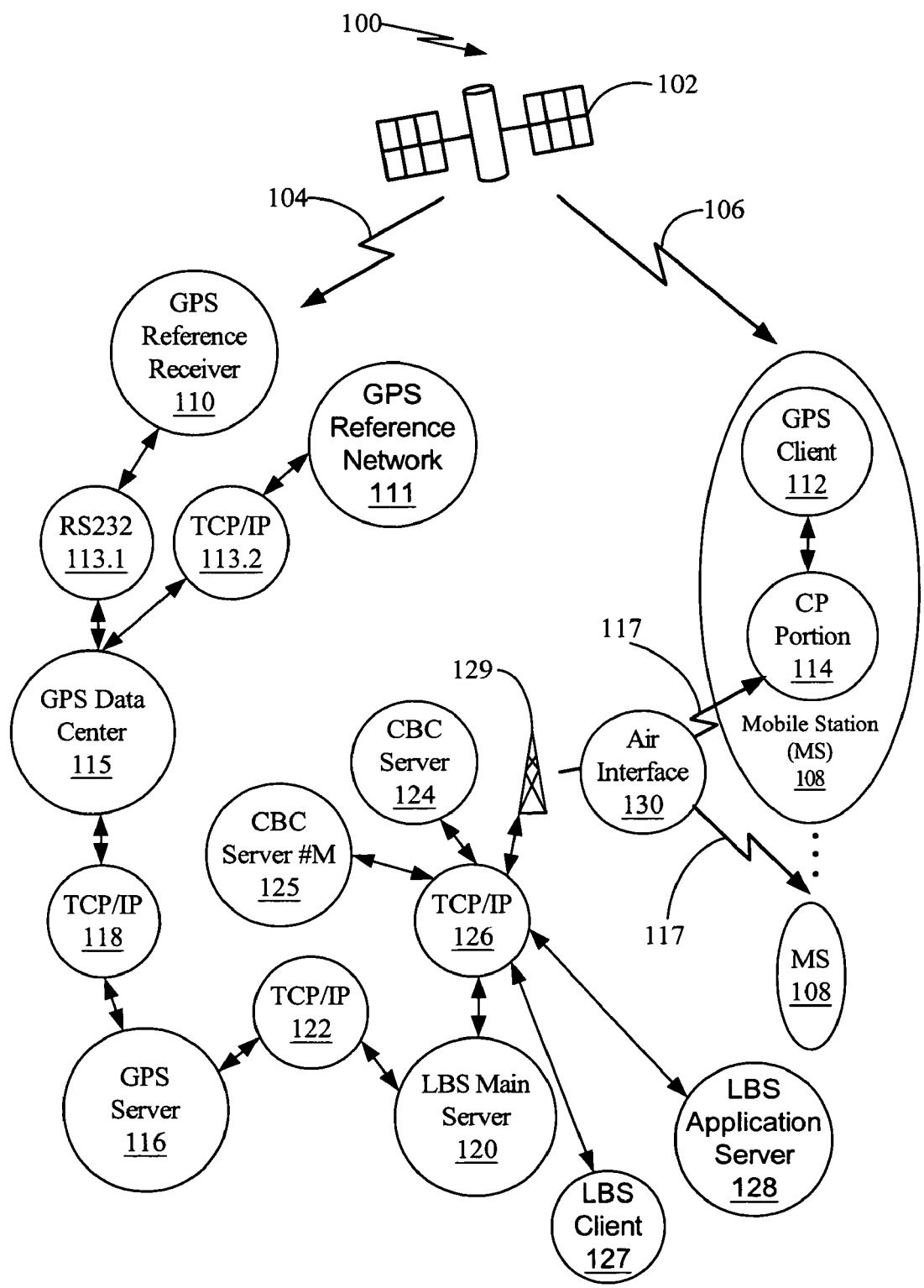
FIG. 1 illustrates a functional framework of satellite positioning system with a LBS main server and cell broadcast control (CBC) servers that broadcast positioning information to multiple Mobile Stations.

Turning first to FIG. 1, a functional framework of a satellite position system 100 is shown. A plurality of satellites, one of which is shown 102, orbits the Earth in a constellation. An example of such a satellite constellation is the global positioning system (GPS) operated by the United States Government. The satellite 102 communicates 104 and 106 with a GPS enabled device such as Mobile Station 108 and a GPS reference receiver 110. The Mobile Station 108 may have a GPS client 112 and a communication part (call processing portion) 114 that is able to communicate with a communication and or data network 117 such as a cellular, Bluetooth, or 802.11 type wireless networks for example.

The GPS reference receiver 110 collects positioning data from a GPS receiver. The positioning data may include Ephemeris, Almanac, GPS time as well as other GPS data. The GPS reference receiver 110 may be in communication with a GPS Data Center 115 via a communication link such as RS232 link 113.1 that carries a protocol such as NMEA-108, RTCM104, and/or propriety message formats designed for the receiver. The GPS Data Center 115 stores the positioning data received by the GPS reference receiver 110. Similarly, a GPS reference network 111 may provide positioning data that may be transmitted via TCP/IP link 113.2 to the GPS data center 115. The links 113.2, 118, 122, and 126 are shown as TCP/IP links in FIG. 1, but other types of communication networking links or protocols may be used, including other connection-less (i.e. packet) protocols and connection-oriented protocols. In other implementations, a combination of protocols may also be used to enable communication between the devices shown in FIG. 1.

The RS232 link 113.1 may be transported over a TCP/IP link or a dedicated link such as a microwave communication link to give but a few examples. The GPS Data Center 115 may be in communication with a GPS server 116 over a TCP/IP connection 118.

The GPS server 116 may process positioning data received from the GPS Data Center 115 in order to generate aiding data. Further, the GPS server 116 may receive positioning data from another device and determines a position by processing that positioning data along with the aiding data. The GPS server 116 may then respond to the other device with the positioning result. The GPS server 116 may communicate with a location based services (LBS) main server 120 over a TCP/IP link 122. The GPS server 116 is capable of providing the LBS main server 120 with the A-GPS data as defined by 3GPP TS44.035, V4.0.0(2001-04) standard document in addition to Mobile Station position results. In other implementations, other types of A-GPS data formatting may be employed.

The LBS main server 120 may also communicate with a cell broadcast control (CBC) server 124 over another TCP/IP link 126. The TCP/IP link 126 may also provide a communication path beaten a LBS main server 120 and any number of other CBC servers, such as CBC server 125. The LBS main server 120 may control the broadcasting of aiding information by CBC server 124 and provides a transport mechanism for aiding information between the GPS server 116 and Mobile Station 108. The broadcasting of aiding information may occur for each GPS satellite or in an individual message that is divided for transmission to the Mobile Station 108. Furthermore, the broadcasting of aiding information may occur at predetermined time periods or upon an occurrence of a predetermined event, such as the almanac being updated, a network triggered event, a user triggered event or new satellites coming into view.

The LBS main server 120 may also communicate with a LBS client 127 and a LBS application 128. Examples of LBS applications may include services such as an enhanced 911 (E911) server for a public safety answering point (PSAP) or other data services such as providing locations of nearby restaurants, stores, or entertainment venues. The LBS client 127 is a client that enables the LBS services to be accessed over the TCP/IP 126 connection. It is also possible for the LBS client 127 to reside in the Mobile Station, such as Mobile 108. The network elements 110, 115, 116, 120, and 124 are shown as separate network elements. In other implementations, the network elements may be combined or relocated within the network.

The GPS server 116 provides aiding information, such as ephemeris, almanac and DGPS data to the LBS main server 120 via TCP/IP connection 122 for broadcasting to multiple Mobile Stations (such as mobile station 108) via the CBC server 124. The Mobile Station 108 may be an electrical device such as, but not limited to, a cellular telephone, Personal Computer (PC), handheld computer, Personal Digital Assistant (PDA), PCS devices, and Bluetooth enabled devices. The CBC server 124 may communicate with the Mobile Station 108 by sending data to a base station 129 using the TCP/IP connection 126. The base station 129 then transfers the data from the CBC server 124 to the Mobile Station 108 over an air interface 130. The air-interface 130 may be, for example, a cellular telecommunication standards protocols such as IS-801, CDMA, TDMA, AMPs, NAMPs, iDEN, or other wireless communication standards such as Bluetooth or Wi-Fi to name but a few. The air-interface 130 may be transmitted over the infrastructure of the network 117, such as a network tower connected to base stations and transport networks such as public switch telephone networks (PSTNs).

Figure 2:
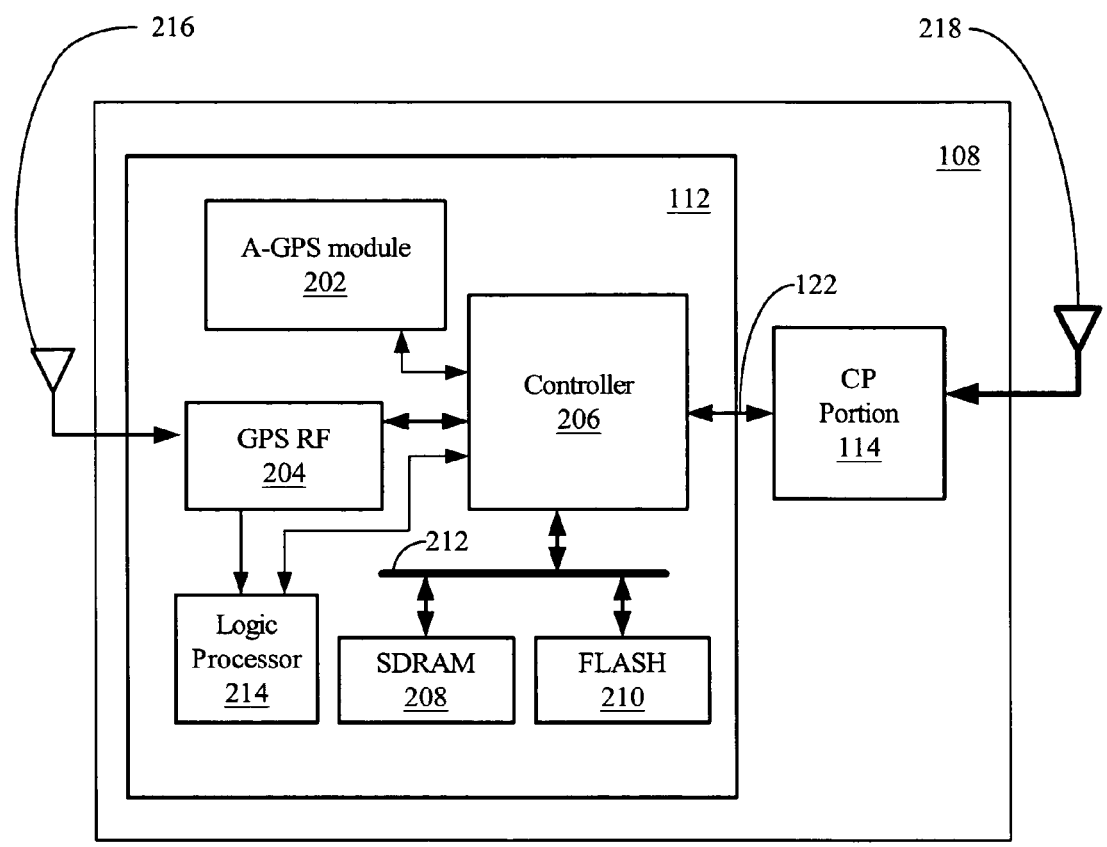
FIG. 2 is a block diagram of the Mobile Station of FIG. 1 with the GPS module that supports aided GPS broadcast positioning.

Turning to FIG. 2, a block diagram of the Mobile Station 108 of FIG. 1 with the A-GPS module 202 that supports reception of aided GPS broadcast positioning is illustrated. The GPS client 112 of the GPS enabled Mobile Station 108 has a GPS RF receiver 204, a controller 206, Synchronous Dynamic Random Access Memory (SDRAM) 208, flash memory 210, bus 212, and a logic processor block 214. The GPS RF receiver 204 receives the ranging signals (spread spectrum signals in the present implementation) via antenna 216. The controller 206 communicates with the A-GPS module 202, GPS RF receiver 204 and logic processor block 214.

The controller 206 executes a plurality of instructions stored in memory, i.e. SDRAM 208 and flash memory 210, and acts on the results generated by the logic processor block 214 that processes the received spread spectrum signal. In an alternate implementation, the flash memory 210 may be readonly memory or other types of reprogrammable memory. The logic processor 214 may be an analog-to-digital converter, match filter, correlators or a combination of the previous digital logic devices and other logic devices that aid in the processing of ranging signals, such as GPS spread spectrum signals. The controller 206 accesses the SDRAM 208 and flash memory 210 over bus 212.

The controller 206 may also communicate with a host portion or CP portion 114 that may have a processor or controller in addition to the baseband processor and communicate with a wireless network via antenna 218. The logical processor 214 or controller 206 processes the I & Q measurements or digital RF from the data network 117 in the CP portion 114. The CP portion 114 may communicate with the controller 206 to receive the I and Q measurements. Or in an alternate implementation, the CP portion 114 may communicate with the GPS RF Receiver 204 and receive digital RF data. The processing portion of the CP portion 114 may have a memory with a plurality of instructions that the processor or controller execute to process the I & Q measurements.

If the controller 206 is not able to determine the location of the GPS enabled Mobile Station 108, then additional augmentation data or aiding data may be employed as determined by the A-GPS module 202. Such data may be retrieved from a broadcast message from a CBC server 124.

Once the location of the GPS enabled Mobile Station 108 is determined, data such as the current almanac, ephemeris, GPS time, and DGPS data may be sent to the virtual satellite system server 202 that may reside in the GPS client 112.

The GPS client 112 of the GPS enabled Mobile Station 108 may have different modes, such as autonomous mode, network aided mode, and network centric mode that also may include communicating with virtual satellite system servers. In FIG. 2, the GPS client 112 functions as a sensor with the controller 206 generating raw data, such as I and Q measurement samples, for use by the CP portion 114. In this configuration, more power of the multifunctional portion may be used to acquire weaker signals.

The GPS enabled Mobile Station 108 in an active mode may execute a plurality of instructions that operates the GPS client 112 as the sensor function. The sensor function results in the GPS client 112 receiving spread spectrum signals via antenna 216 at GPS RF receiver 204 and the generating raw pseudo range data by the controller 206. The raw pseudo range data is then sent to the CP portion 114 over communication path 122. The processing power of the CP portion 114 may then be used in conjunction with the controller 206 to compute the latitude, longitude, altitude, time, heading, and velocity. The CP portion 114 may simply pass location data to the controller 206, act as a host for the GPS client, or preprocess/process location data. Thus, the added processing power of the CP portion 114 may be employed to aid in location determination. Another advantage of the sensor function is the ability to acquire weaker signals (as low as −162 dbm). The sensor function may have the greatest impact on a device incorporating a GPS client 112, but results in the ability to acquire weaker satellite signals and more quickly lock on to acquired signals. The A-GPS broadcast by the CBC server 124 may be used by the Mobile Station 108 when in the network assisted mode or in the network centric mode.

Although the memory is depicted in FIG. 2 as SDRAM 208 or flash memory 210, one skilled in the art will appreciate that all or part of systems and methods consistent with the present invention may be stored on or read from other machine-readable media, for example, secondary storage devices such as hard disks, floppy disks, and CD-ROMs; a signal received from a network; or other forms of ROM or RAM either currently known or later developed. Further, although specific components of the GPS enabled Mobile Station 108 are described, one skilled in the art will appreciate that a positioning system suitable for use with methods, systems, and articles of manufacture consistent with the present invention may contain additional or different components. For example, the controller 206 may be a microprocessor, microcontroller, application specific integrated circuit ("ASIC"), discrete or a combination of other types of circuits acting as a central processing unit, a specially designed DSP that processes data in blocks of size other than multiples of eight bit. The memory 208 may be RAM, DRAM, EEPROM, or any other type of read/writeable memory.

Figure 3:
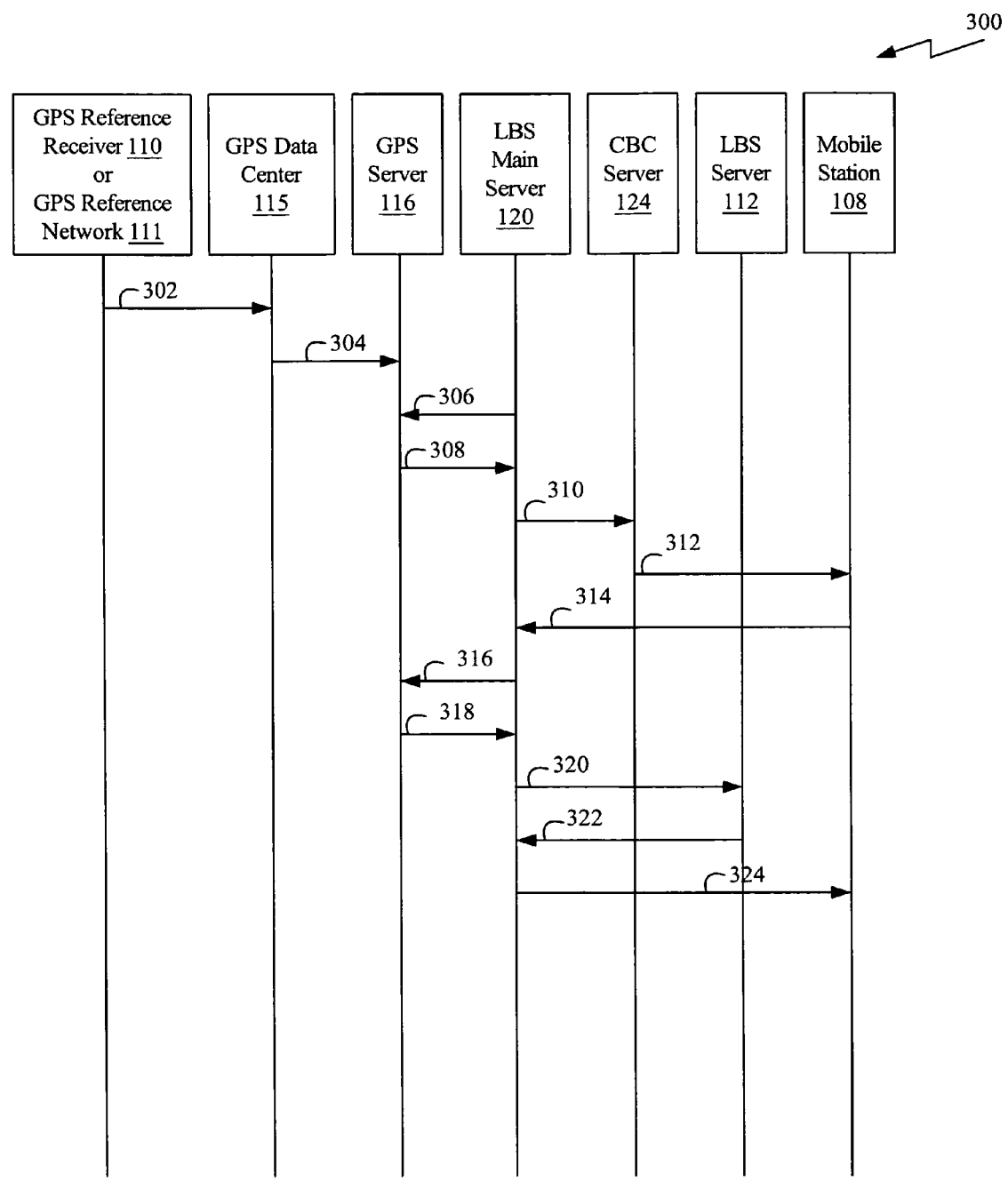
FIG. 3 is a messaging diagram between the devices located in the satellite position system of FIG. 1.

In FIG. 3, a messaging diagram between the devices located in the satellite position system of FIG. 1 is illustrated. The GPS reference receiver 110 or GPS Reference Network receives raw positioning signals from the GPS satellites. The positioning signals are decoded by the GPS reference receiver 110 or GPS Reference Network and the resulting data is sent in a GPS data message 302 to the GPS data center 115 over the RS232 link 113.1 or TCP/IP link 113.2. The GPS data center is a repository of GPS data such as ephemeris, almanac, GPS time, DGPS data that is sent to the GPS server 116 in a GPS data message 304 whenever the GPS data contained at the GPS data center 115 changes. The GPS server 116 may store the GPS data in internal RAM and accesses the GP data in order to calculate satellite trajectory data. Further, the GPS server 116 may also generate satellite visibility list to be used for creating the aiding data for the network.

The LBS main server 120 may send a broadcast service request 306 to the GPS server 116. The broadcast service request 306 may be in the form of a "request for Mobile Station position message." Further the broadcast service request 306 may contain:

1. approximate location of the broadcast area including the uncertainty of the approximate position;
2. broadcast ID that ties a specific CBC server to a targeted service area;
3. maximum number of satellite for the aiding data;
4. types of aiding data (ephemeris, almanac, etc. . . . );
5. how often the aiding data is to be provide to the LBS main server 120;
6. start time and end time of sending the broadcast message.

The time interval for sending the broadcast service request 306 may be dependent on the aiding data type; the time for the ephemeris data set may be broadcast every 90 seconds or 12 minutes, and Almanac may be broadcast once a predetermine time periods, such as two hours. The GPS server 116 may then respond with an A-GPS data message 308 that contains the A-GPS data such as ephemeris, A-GPS time, almanac, and DGPS data being sent to the LBS main server 120. The A-GPS data message 308 may be one aiding message for each GPS satellite, or one aiding message that combines all satellite aiding data into a number of fragments. The LBS main server 120 then sends the A-GPS data to the CBC server 124 in an A-GPS server data message 310.

The LBS main server 120, may communicate with multiple CBC servers within a network and all CBC servers are sent the A-GPS server data message 310. In other implementations, the A-GPS server data message may be sent to a single CBC server, such as CBC server 124, or a subset of CBC servers that may reside in the network.

The CBC server receives the A-GPS server data message 310, and then formats a broadcast A-GPS message 312 that is sent to the Mobile Stations within it's service area, such as Mobile Station 108 located in the network 100. The broadcast A-GPS message 312 may be formatted according to the format contained in 3GPP TS44.035, V4.0.0 (2001-04) standard document. In other implementations, other formats for transmission of A-GPS data may be employed, such as formatting for transmission of A-GPS data in a CDMA network, GSM network, iDEN network, or other wireless communication network. In other implementations, the broadcast message format may not follow the 3GPP standard of adding ciphering information before the A-GPS data, rather the A-GPS data may be treated as normal text message enabling the Mobile Station 108 to decode the A-GPS data without the added processing required to strip out the non-aiding data such as the ciphering data.

The Mobile Station 108 receives the broadcast A-GPS message 312 and the CP portion 114 of the Mobile Station 108 collects the A-GPS data if the A-GPS module 202 is in the off or sleep mode due to the operational mode of the Mobile Station 108. If the A-GPS module 202 is on or awaken/turned on, then the CP portion 114 passes the A-GPS data to the A-GPS module 202 that computes the position of the Mobile Station and sends the result to the CP portion 114.

The Mobile Station 108 may then send the A-GPS position information to the LBS main server 120 in an A-GPS position information message 314. The LBS main server 120 then sends the A-GPS position information from the Mobile Station 108 to the GPS server 116 in message 316 for tuning of the position if necessary. The GPS server 116 then determines the position of the Mobile Station 108 based on the A-GPS position information received from the LBS main server 116. The final tuned position for the Mobile Station 108 is then sent to the LBS main server 120 in A-GPS position message 318.

The LBS main server 120 may then send the position of the Mobile Station 108 to the LBS server 112 in a message 320 where applications using the position of the Mobile Station 108 are executed, such as locating nearby gas stations. Using the gas station example, the LBS server 112 then transmits the locations of the nearby gas stations in a message 322 to the LBS main server 120. The LBS main server 120 then sends the nearby gas stations to the Mobile Station 108 in a short message service (SMS) message 324.

Figure 4:
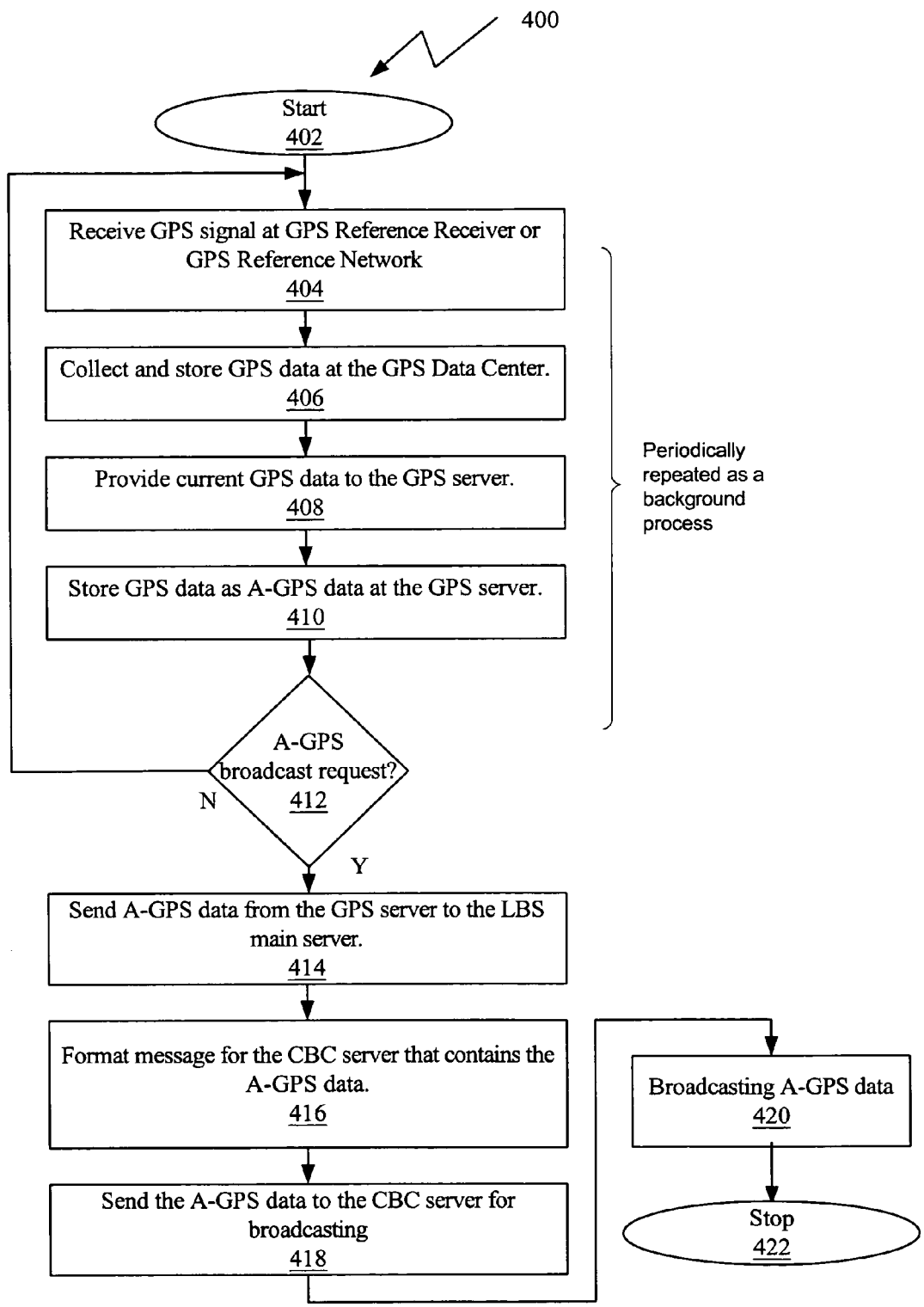
FIG. 4 is a flow diagram of the step for implementing the aided GPS broadcast positioning system of FIG. 1.

Turning to FIG. 4 a flow diagram 400 of the step for implementing the aided GPS broadcast positioning system of FIG. 1 is shown. The diagram 400 starts 402 with a GPS signal being received at the GPS reference receiver 110 or the GPS Reference Network 111 in step 404. In step 406, the GPS data is collected and stored at the GPS data center 115. Current or changed GPS data is supplied by the GPS data center 115 to the GPS server 116 in step 408 and the GPS server 116 store the GPS data as A-GPS data in step 410.

If a request for A-GPS broadcast has been initiated by the LBS main server 120 in step 412, then the GPS server 116 is contacted and A-GPS data is supplied to the LBS main server 120 in step 414. Steps 404, 406, 408 and 410 are periodically repeated as a background process to ensure the GPS server 116 is always maintain the latest GPS data for broadcast request.

The LBS main server 120 formats the A-GPS data in a message for the CBC server 124 in step 416. In step 418, the LBS main server 120 sends the formatted A-GPS data to the CBC server for broadcasting. The A-GPS data is then broadcast by the CBC server 124 to the Mobile Station 108 in step 420 and processing is shown stopping at step 422. In practice, processing will continue on and be repeated indefinitely.

Parts of this implementation may be implemented in hardware, software, or a combination of hardware and software. Aspects of the present invention may be implemented as instructions in memory, one skilled in the art will appreciate that all or part of systems and methods consistent with the present invention may be stored on or read from other machine-readable media, for example, secondary storage devices such as hard disks, floppy disks, and CD-ROMs; a signal received from a network; or other forms of ROM or RAM either currently known or later developed.

The foregoing description of an implementation has been presented for purposes of illustration and description. It is not exhaustive and does not limit the claimed inventions to the precise form disclosed. Modifications and variations are possible in light of the above description or may be acquired from practicing the invention. For example, the described implementation includes software but the invention may be implemented as a combination of hardware and software or in hardware alone. Note also that the implementation may vary between systems. The claims and their equivalents define the scope of the invention.

What is claimed is:

1. A method for the transfer of aiding data in a wireless network, comprising:
   identifying a predetermined network triggered event at a location based service server;
   initiating by the location based service server a broadcast service request to a global positioning system (GPS) server within the wireless network in response to the predetermined network triggered event;
   receiving by the location based service server aiding data from the GPS server within the wireless network in response to the broadcast service request;
   generating a message containing aiding data at the location based service server; and
   transmitting the message from the location based service server to a broadcast server, wherein the broadcast server is independent of the location based service server, and wherein the aiding data is to be broadcast in the wireless network by the broadcast server for receipt by a plurality of wireless devices that access the aiding data.

2. The method for transfer of aiding data of claim 1, where identifying a predetermined network triggered event further includes receiving notification of a change in aiding data.

3. The method for the transfer of aiding data of claim 1, where identifying a predetermined network triggered event further includes expiring of a predetermined timer.

4. The method of claim 3, where the predetermined timer is associated with the almanac data being updated.

5. The method of claim 1, where generating a message containing aiding data further includes formatting the message containing aiding data according to the 3GPP TS44.035 V4.0.0(2001-04) standard document.

6. The method of claim 1, where generating a message containing aiding data further includes formatting the message for transmission in a CDMA network.

7. The method of claim 1, where the message containing aiding data is associated with an individual positioning satellite.

8. The method of claim 1, where the aiding data includes at least one of the following, broadcast ID, maximum number of satellites for the aiding data, types of aiding data, start time of sending the broadcast message and end time of sending the broadcast message.

9. A device associated with a wireless network that transfer aiding data, comprising:
   a network triggered event occurs at a location based service server associated with the wireless network;
   the location based service server initiates a broadcast service request to a global positioning system (GPS) server within the wireless network in response to the network triggered event;
   the location based service server receives aiding data from the GPS server within the wireless network in response to the broadcast service request;
   a broadcast message is formatted with the aiding data by the location based service server in the response to the network triggered event, where the aiding data was originally received via the wireless network; and
   a transmitter coupled to the location based service server transmits the broadcast message to a broadcast server, wherein the broadcast server is independent of the location based service server, and wherein the broadcast message is to be broadcast in the wireless network by the broadcast server for receipt by a plurality of other devices that access the aiding data in the broadcast message.

10. The device of claim 9, further comprising a receiver in the location based service server receives aiding data and stores it in a memory.

11. The device of claim 9, wherein the network triggered event trigger occurs upon a change to the aiding data.

12. The device of claim 11, where the change is updating of almanac data.

13. The device of claim 9, wherein the event trigger is a timer.

14. The device of claim 9, wherein the event trigger is a counter.

15. The device of claim 9, where the broadcast message contains data associated with an individual position satellite.

16. The device of claim 9, where the aiding data includes at least one of the following, broadcast ID, maximum number of satellites for the aiding data, types of aiding data, start time of broadcast message, and end time of broadcast message.

17. A server executing a plurality of instructions for the transfer of aiding data in a wireless network, the plurality of instructions comprising instructions for:
   identifying a predetermined network triggered event at a location based service server;
   initiating by the location based service server a broadcast service request to a global positioning system (GPS) server within the wireless network in response to the predetermined network triggered event;
   receiving by the location based service server aiding data from the GPS server within the wireless network in response to the broadcast service request;
   generating a message containing aiding data at the location based service server; and
   transmitting the message from the location based service server to a broadcast server, wherein the broadcast server is independent of the location based server, and wherein the aiding data is to be broadcast in the wireless network by the broadcast server for receipt by a plurality of wireless devices that access the aiding data.

18. The server executing a plurality of instructions for the transfer of aiding data in a wireless network, the plurality of instructions of claim 17, where the instructions for identifying a predetermined network triggered event further includes instructions for receiving notification of a change in aiding data.

19. The server executing a plurality of instructions for the transfer of aiding data in a wireless network, the plurality of instruction of claim 17, where the instructions for identifying a predetermined network triggered event further includes instructions for expiring of a predetermined timer.

20. The server executing a plurality of instructions for the transfer of aiding data in a wireless network, the plurality of instructions of claim 19, where the predetermined timer is associated with the almanac data being updated.

21. The server executing a plurality of instructions for the transfer of aiding data in a wireless network, the plurality of instructions of claim 17, where the instructions for generating a message containing aiding data further includes instructions for formatting the message containing aiding data according to the 3GPP TS44.035 V4.0.0(2001-04) standard document.

22. The server executing a plurality of instructions for the transfer of aiding data in a wireless network, the plurality of instructions of claim 17, where the instructions for generating a message containing aiding data further includes instructions for formatting the message for transmission in a CDMA network.

23. The server executing a plurality of instruction for the transfer of aiding data in a wireless network, the plurality of instructions of claim 17 where the message containing aiding data is associated with an individual positioning satellite.

24. The server executing a plurality of instructions for the transfer of aiding data in a wireless network, the plurality of instructions of claim 17 where the aiding data includes at least one of the following, broadcast ID, maximum number of satellites for the aiding data, types of aiding data, smart time of sending the broadcast message and end time of sending the broadcast message.

\* \* \* \* \*

UNITED STATES PATENT AND TRADEMARK OFFICE
CERTIFICATE OF CORRECTION

| | | Page 1 of 1 |
|---|---|---|
| PATENT NO. | : 7,668,554 B2 | |
| APPLICATION NO. | : 11/303881 | |
| DATED | : February 23, 2010 | |
| INVENTOR(S) | : Chang | |

It is certified that error appears in the above-identified patent and that said Letters Patent is hereby corrected as shown below:

In the Specification

In Column 7, Line 19, delete "multifunctional" and insert -- multifunction --, therefor.

In Column 8, Line 49, delete "it's" and insert -- its --, therefor.

In Column 9, Line 13, delete "LBS main server 116." and insert -- LBS main server 120. --, therefor.

In the Claims

In Column 10, Line 25, in Claim 2, delete "for" and insert -- for the --, therefor.

Signed and Sealed this
Eleventh Day of November, 2014

Michelle K. Lee
*Deputy Director of the United States Patent and Trademark Office*